(12) United States Patent
Yaussy et al.

(10) Patent No.: US 8,813,152 B2
(45) Date of Patent: Aug. 19, 2014

(54) METHODS, APPARATUS, AND COMPUTER PROGRAM PRODUCTS FOR PROVIDING INTERACTIVE SERVICES

(75) Inventors: Ledley (Buddy) Yaussy, Duluth, GA (US); Ke Yu, Alpharetta, GA (US); William Brown, Woodstock, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 875 days.

(21) Appl. No.: 12/198,173

(22) Filed: Aug. 26, 2008

(65) Prior Publication Data

US 2010/0058423 A1    Mar. 4, 2010

(51) Int. Cl.
*H04N 7/173* (2011.01)
*H04N 7/10* (2006.01)
*H04N 7/025* (2006.01)

(52) U.S. Cl.
USPC ............ 725/112; 725/32; 725/34; 725/35; 725/105; 725/110; 725/136

(58) Field of Classification Search
USPC ................... 725/110–113, 135, 136
See application file for complete search history.

(56) References Cited

U.S. PATENT DOCUMENTS

| | | | |
|---|---|---|---|
| 6,177,931 B1 * | 1/2001 | Alexander et al. | 725/52 |
| 6,326,982 B1 * | 12/2001 | Wu et al. | 715/718 |
| 7,076,793 B1 * | 7/2006 | Nakada et al. | 725/39 |
| 7,117,517 B1 * | 10/2006 | Milazzo et al. | 725/60 |
| 2002/0104101 A1 * | 8/2002 | Yamato et al. | 725/139 |
| 2002/0116268 A1 * | 8/2002 | Fukuda | 705/14 |
| 2002/0124263 A1 * | 9/2002 | Yokomizo | 725/112 |
| 2003/0126616 A1 * | 7/2003 | Dewa | 725/112 |
| 2006/0184989 A1 * | 8/2006 | Slothouber | 725/110 |
| 2006/0195878 A1 * | 8/2006 | Pack et al. | 725/113 |
| 2007/0044010 A1 * | 2/2007 | Sull et al. | 715/500.1 |
| 2009/0259534 A1 * | 10/2009 | Utter et al. | 705/14 |
| 2012/0084822 A1 * | 4/2012 | Durkee et al. | 725/93 |

* cited by examiner

*Primary Examiner* — Nasser Goodarzi
*Assistant Examiner* — Fred Peng
(74) *Attorney, Agent, or Firm* — Cantor Colburn LLP

(57) ABSTRACT

Methods, apparatus, and computer program products for providing interactive services used with a time sensitive interactive application are provided. A request is received for interactive services that corresponds to a program. A program identification (ID) for the program is determined. An interactive application that corresponds to the program is determined based on the program ID, where the interactive application has a corresponding interactive application ID. The interactive application ID that corresponds to the interactive application for the program is provided.

18 Claims, 5 Drawing Sheets

FIG. 3

| Start Time | Stop Time | Channel | Program Interactive Application |
|---|---|---|---|
| 7:00 EST | 9:00 EST | 105   NBC | American Idol #4545 URL: www.AmericanIdol.4545 |

310 320 330 340

300

METHODS, APPARATUS, AND COMPUTER PROGRAM PRODUCTS FOR PROVIDING INTERACTIVE SERVICES

BACKGROUND

Exemplary embodiments relate generally to communications, and more particularly, to providing interactive services.

Internet protocol television (IPTV) service is a digital television delivery service, wherein the digital television signal is delivered to users via a computer network infrastructure using the Internet Protocol. Typically, IPTV services are bundled with additional Internet services, such as Internet web access and voice over Internet protocol (VoIP). Subscribers and users of subscriber devices receive IPTV services via a set top box that is connected to or incorporated in the same device as a television or display device for the reception of a digital signal. Used in conjunction with an IP-based platform, the set top box allows for a subscriber or other user to access IPTV services and any additional services that are integrated within the IPTV service.

A user may view content on a television via an IPTV platform and desire to participate in an activity that is occurring on the television. The user may have to leave the television and place a telephone call to submit his/her selection in accordance with the activity that is occurring on television.

BRIEF SUMMARY

Exemplary embodiments include a method for providing interactive services used with a time sensitive interactive application. A request is received for interactive services that corresponds to a program. A name of the program and a program identification (ID) for the program are determined. An interactive application that corresponds to the program is determined based on the program ID, where the interactive application has a corresponding interactive application ID. The interactive application ID that corresponds to the interactive application for the program is provided.

Additional exemplary embodiments include an apparatus for providing interactive services used with a time sensitive interactive application. Memory stores a program for providing interactive services. A processor is functionally coupled to the memory, and the processor is responsive to computer-executable instructions contained in the program and operative to receive a request for interactive services that corresponds to a program. The processor is operative to determine a name of the program and a program identification (ID) for the program, and determine an interactive application that corresponds to the program based on the program ID, where the interactive application has a corresponding interactive application ID. Also, the processor is responsive to provide the interactive application ID that corresponds to the interactive application for the program.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES:

FIG. 3 illustrates a table which depicts information that can be used to map to a corresponding program interactive application in accordance with exemplary embodiments;

The detailed description explains exemplary embodiments, together with advantages and features, by way of example with reference to the drawings.

DETAILED DESCRIPTION OF EXEMPLARY EMBODIMENTS

Exemplary embodiments provide interactive services that may be used in coordination with particular media.

Figure 1:
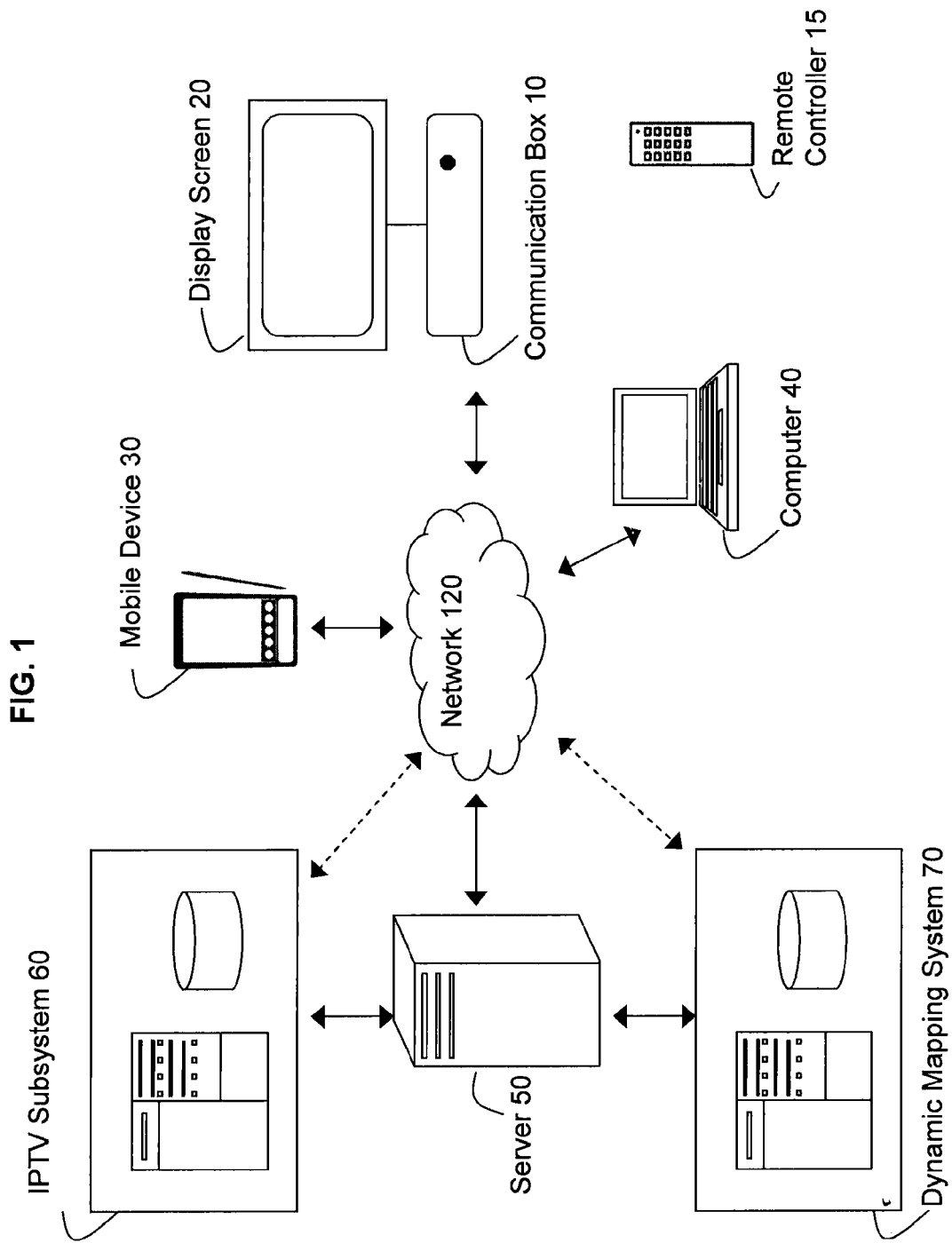
FIG. 1 illustrates an architecture in which program and time sensitive interactive applications may be launched for program interactive services according to exemplary embodiments.

FIG. 1 illustrates an architecture in which program and time sensitive interactive applications may be launched for program interactive services according to exemplary embodiments.

FIG. 1 illustrates a communication box 10 operatively connected to (or incorporated in the same device as) a display screen 20. The communication box 10 may be, e.g., a set top box, a gaming system, a computer, or any type of media system. A remote controller 15 may be used for operating the communication box 10. The communication box 10 is operatively connected to a network 120 for communicating with various entities.

A server 50 may be operatively connected to the network 120. The server 50 may be directly connected to an Internet protocol television (IPTV) subsystem 60, or the server 50 may be operatively connected to the IPTV subsystem 60 via the network 120. Also, the server 50 may be directly connected to a dynamic mapping system 70, or the server 50 may operatively connected to the dynamic mapping system 70 via the network 120.

The IPTV subsystem 60 may include various hardware and software components, such as multiple servers and databases. The IPTV subsystem 60 may include an operation support system (OSS) and a business support system (BSS). The dynamic mapping system 70 may include various hardware and software components, such as servers and databases.

Additionally, the network 120 may include circuit-switched and/or packet-switched technologies and devices, such as routers, switches, hubs, and gateways, for facilitating communications. The network 120 may include wireline and/or wireless components utilizing, e.g., IEEE 802.11 standards for providing over-the-air transmissions of communications. The network 120 can include IP-based networks for communication between a customer service center and clients/users. The network 120 can be representative of countless networks.

In exemplary embodiments, the network 120 can be a managed IP network administered by a service provider, which can control bandwidth and quality of service for the communications discussed herein. The network 120 may be implemented in a wireless fashion, e.g., using wireless protocols and technologies, such as WiFi, WiMax, and/or BLUETOOTH. The network 120 can also be a packet-switched network as a local area network, a wide area network, a metropolitan area network, an Internet network, or other similar types of networks. The network 120 may be a cellular communications network, a fixed wireless network, a wireless local area network (LAN), a wireless wide area network (WAN), a personal area network (PAN), a virtual private network (VPN), an intranet or any other suitable network, and the network 120 may include equipment for receiving and transmitting signals, such as a cell tower, a mobile switching center, a base station, and a wireless access point.

Furthermore, exemplary embodiments are not limited to but are capable of being implemented in the architecture illustrated in FIG. 1. Additionally, the server 50 may be representative of numerous servers. The IPTV subsystem 60 and the dynamic mapping system 70 may be representative of numerous systems. Therefore, the architecture illustrated in FIG. 1 is neither limited numerically to the elements depicted therein nor limited to the exact configuration and operative connections of elements. Further, it is understood by those skilled in the art that elements may be added to, subtracted from, or substituted for the elements described in FIG. 1.

Figure 2:
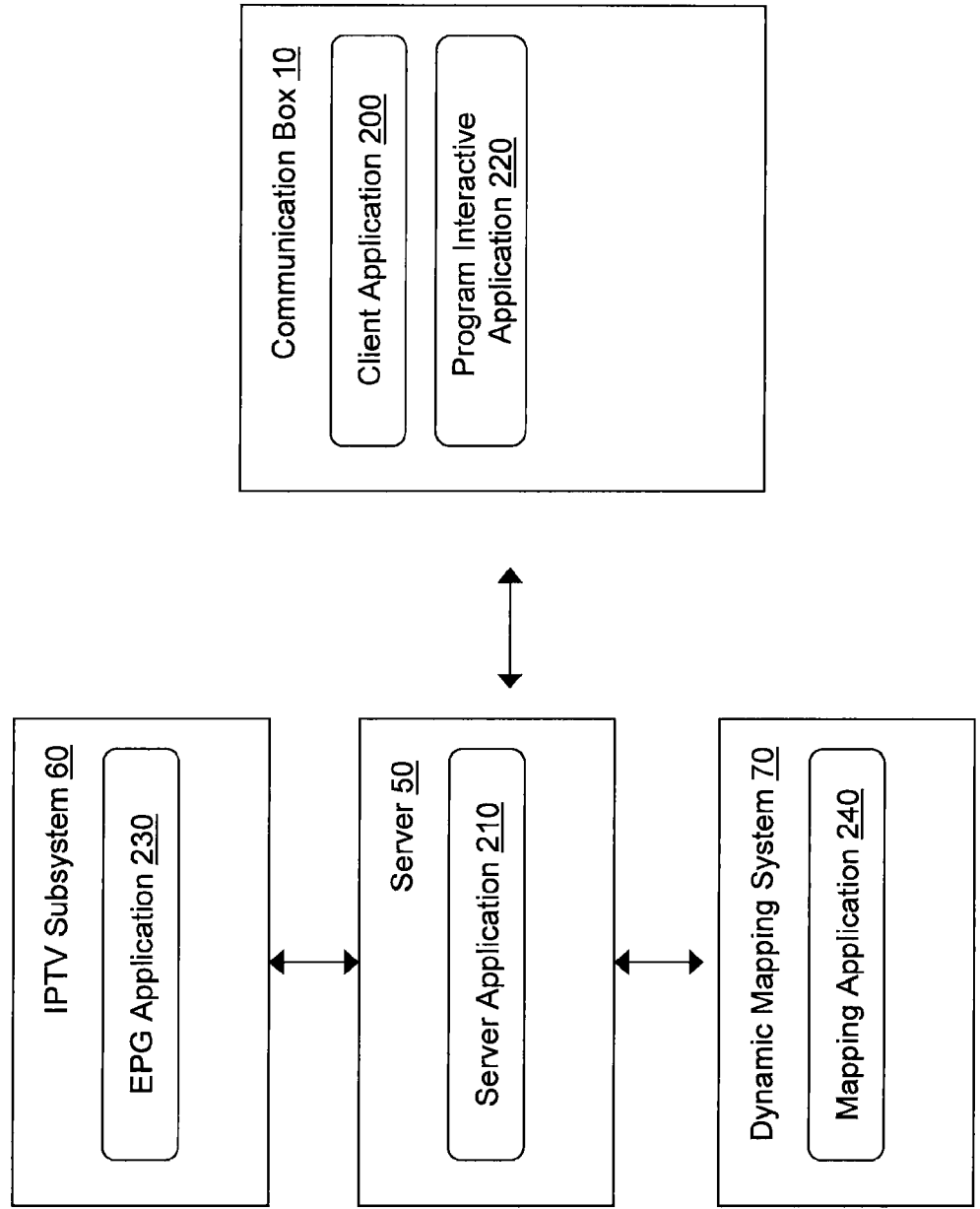
FIG. 2 illustrates a block diagram showing details of various components of the architecture of FIG. 1 in accordance with exemplary embodiments.

FIG. 2 illustrates a block diagram showing details of various components of the architecture of FIG. 1 in accordance with exemplary embodiments.

A user may desire to activate program interactive services according to exemplary embodiments. Program interactive services may include allowing the user to vote for options being viewed on the display screen 20, to select and purchase items being viewed on the display screen 20, and/or to select an MVP (most valuable player) candidate being viewed on the display screen. The user may select, e.g., an interactive button on the remote controller 15 to activate program interactive services. Also, the user may open a client application 200 on the communication box 10 and then activate program interactive services via the client application 200.

Also, the user may be viewing media on a mobile device 30 or a computer 40. The user may open the client application 200 on the mobile device 30 or the computer 40, and the user may activate program interactive services via the client application 200.

The user may be viewing a particular program on a particular channel. In response to the user activating program interactive services, the client application 200 transmits information to a server application 210 residing on the server 50. The information transmitted from the client application 200 to the server application 210 may include a client identification (ID) (or user ID), the channel currently being viewed by the user, and a time stamp of the current time. The client ID uniquely identifies the user.

The server application 210 receives the information from the client application 200. The server application 210 authenticates the user. For example, the server application 210 may request a password or code that corresponds to the unique client ID transmitted by the client application 200 of the communication box 10.

The server application 210 performs an electronic programming guide (EPG) call to an EPG application 230 of the IPTV subsystem 60. According to exemplary embodiments, the EPG call includes transmitting the channel (number) and the time stamp (for the program the user is viewing) to the EPG application 230. In response to receiving the EPG call, the EPG application 230 of the IPTV subsystem 60 may determine a program ID and/or the name of the program, which corresponds to the channel and time stamp. The EPG application 230 returns the program ID and/or the name of the program to the server application 210.

The server application 210 may transmit the program ID (and/or the channel, and the time stamp) to a mapping application 240 of the dynamic mapping system 70. The mapping application 240 receives the program ID and maps the program ID to a specific program interactive application, such as the program interactive application 220, for the program. Also, the mapping application 240 may receive a channel and time stamp for the program, and the mapping application 240 maps the channel and time stamp to the specific program interactive application 220 for the program. The program interactive application 220 has a program interactive application ID. Also, the program interactive application 220 may correspond to a particular uniform resource locator (URL) or a Global Unique ID (GUID).

The mapping application 240 may transmit the program interactive application ID and/or the corresponding URL for the program interactive application 220 to the server application 210. The server application 210 may transmit the URL and/or the program interactive application ID corresponding to the program to the client application 200 of the communication box 10.

In accordance with exemplary embodiments, the client application 200 may open a browser, e.g., an Internet browser, and launch the URL for the program interactive application that corresponds to the program in the browser. Alternatively and/or additionally, the communication box 10 may have various program interactive applications stored in memory, and the client application 200 may launch the specific program interactive application that corresponds to the program interactive application ID received from the server 50. The communication box 10 may perform various updates to receive the most recent program interactive application to store in memory.

As an example, the program interactive application 220 represents a program interactive application that may be launched on the communication box 10. Further, the program interactive services may be time sensitive such that the user can interactively participate with a current program being offered (displayed on the display 20) at a particular time. For example, a series of music videos may be viewed on the display screen 20, and via the program interactive application 220, the user can cast his or her selection for the desired music video using the remote controller 15. Since exemplary embodiments allow program interactive services to be time sensitive, the user can immediately activate the program interactive application 220 to participate in the desired activities of the current program. Moreover, exemplary embodiments are able to identify the current program being displayed on the display 20 and accordingly provide program interactive services specific to the current program.

FIG. 3 illustrates a table 300, which depicts information that can be used to map to the corresponding program interactive application. The data in the table 300 may be input by a provisioning service and stored in the dynamic mapping system 70. Also, the provisioning service may utilize a provisioning application to input data for the table 300. The data in the table 300 is only illustrated as an example, and it is understood that additional data fields may be included in the table 300. The provisioning service may be responsible for tying programs viewed on the display screen 20, the mobile device 30, and/or the computer 40 with the respective program interactive application, such as the program interactive application 220. The table 300 may include a start time data field 310, a stop data field 320, a channel data field 330, and a program interactive application data field 340.

As an example, the user may be watching the program American Idol™ on channel 105 NBC at 8:00. The user may desire to activate interactive services using the remote controller 15 to vote for a favorite contestant. The client application 200 transmits the channel 105 NBC with a time stamp 8:00 p.m. eastern standard time (EST) to the server application 210. The server application 210 transmits the channel 105 (NBC) and the time stamp 8:00 p.m. (EST) to the EPG application 230. The EPG application 230 may scan an electronic programming guide to find a program on channel 105 that coincides with the time stamp 8:00 p.m. The EPG application 230 determines that the program is American Idol, which has a corresponding program ID. The server application 210 may transmit the program ID for American Idol™ to the mapping application 240, and/or the server application 210 may transmit the channel 105 NBC and time stamp 8:00 p.m. to the mapping application 240.

The mapping application 240 may search a database to map the information from the server application 210 to the corresponding program interactive application for American Idol™. The program interactive data field 340 of the table 300 depicts that the American Idol™ program interactive application ID is #4545 and that the URL for the American Idol™ program interactive application is www.American Idol.4545. The server application 210 may transmit this information to the client application 200. The client application 200 may use the American Idol™ program interactive application ID #4545 to launch the American Idol™ program interactive application 220 stored in the communication box 10. Also, the client application 200 may use the American Idol™ program interactive application URL www.American Idol.4545 to launch the American Idol™ program interactive application 220. The American Idol™ program interactive application 220 (and other program interactive applications) may be supported by the server 50 or a separate dedicated server.

Once the American Idol™ program interactive application 220 has been activated, the user can vote for the contestant of his/her choice. Although the American Idol™ program has been provided as an illustration, it is understood that exemplary embodiments are not limited to the American Idol™ program. Interactive services of exemplary embodiments may be used for any subject matter, such as sports, shopping, politics, news, children's programming, etc. For example, a user may launch the program interactive application 220 that corresponds to a shopping network so that the user can select an item to purchase. As another example, a user may launch the program interactive application 220 that corresponds to voting in a preliminary poll of candidates on a political talk show.

Figure 4:
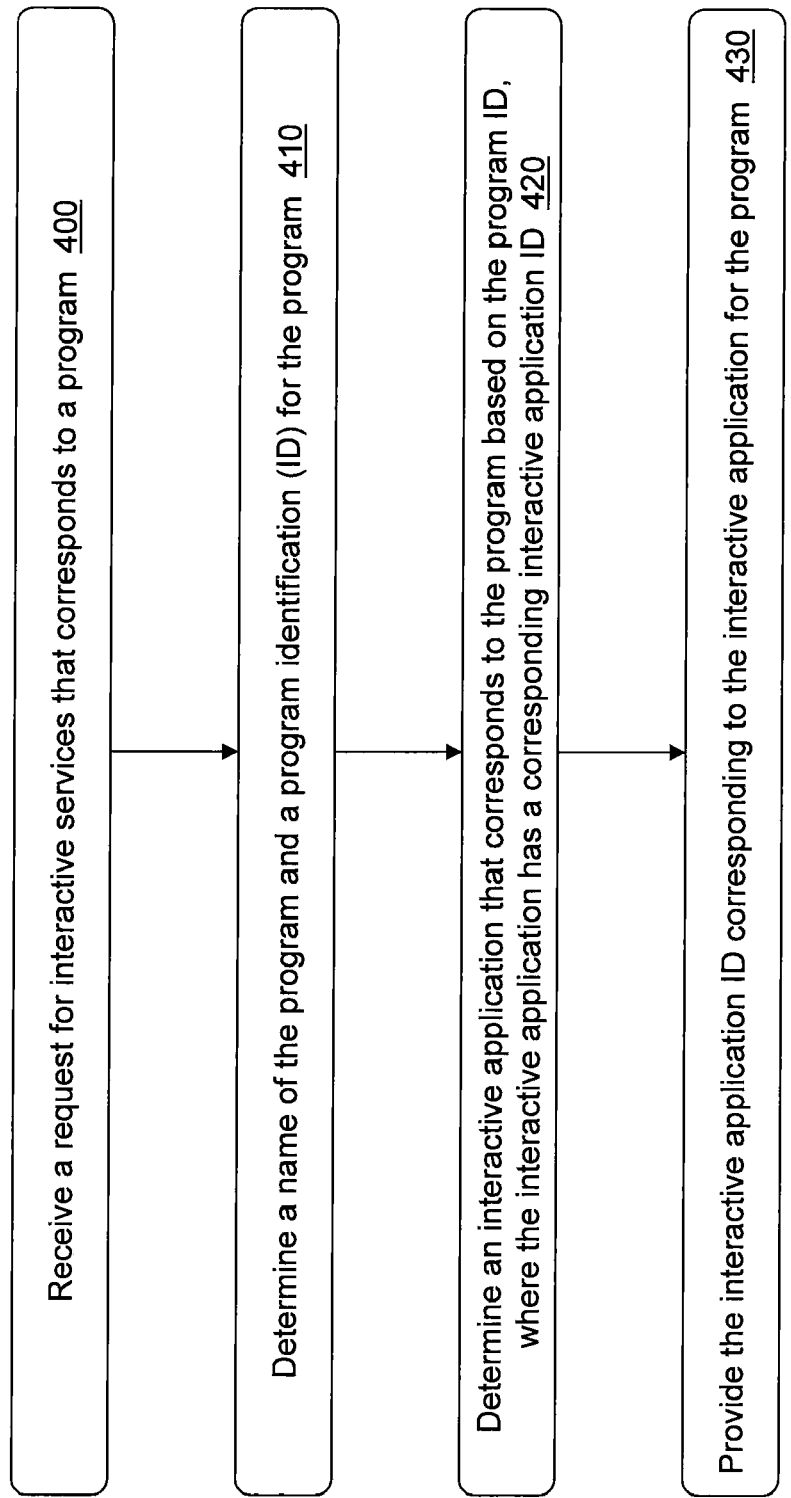
FIG. 4 illustrates an example of a method for providing program interactive services in accordance with exemplary embodiments.

FIG. 4 illustrates an example of a method for providing program interactive services in accordance with exemplary embodiments.

In accordance with exemplary embodiments, a request is received from the communication box 10 for interactive services that corresponds to a program at 400.

A name of the program and/or a program identification (ID) for the program are determined by the server application 210 (via the EPG application 230) at 410.

An interactive application that corresponds to the program based on the program ID is determined by the server application 210 (via the mapping application 240), where the interactive application has a corresponding interactive application ID at 420.

The interactive application ID that corresponds to the interactive application for the program is provided by the server application 210 at 430.

Also, the program may be media broadcast to a user, or the program may be media streamed to a user. The interactive application ID may correspond to a (URL) or GUID for the program, and the URL or GUID may be used to launch the interactive application that corresponds to the program. The interactive application ID may also be used to launch the interactive application that corresponds to the program.

The interactive application allows for selecting options that coincide with the program. For example, the selections may correspond to voting for the options. When the request for interactive services is received, a client ID, a current time stamp, and a channel of the program are also received.

Further, in exemplary embodiments determining the name of the program and the program ID for the program include performing an electronic program guide lookup to find the name of the program, the program ID, a start time for the program, and a stop time for the program. Determining the interactive application that corresponds to the program based on the program ID includes mapping the program ID for the program to the interactive application.

Figure 5:
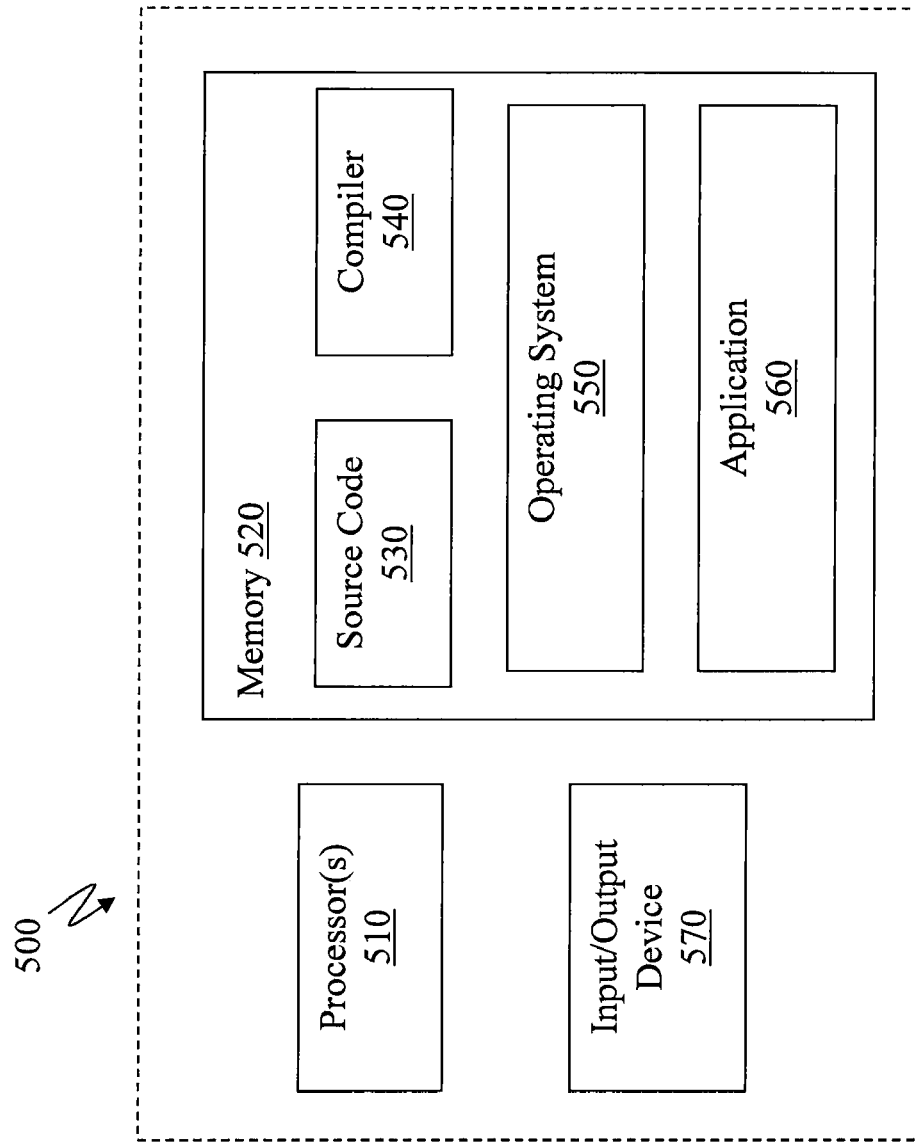
FIG. 5 illustrates an example of a computer having elements that may be used in implementing exemplary embodiments.

FIG. 5 illustrates an example of a computer 500 having elements that may be used in implementing exemplary embodiments. The computer 500 includes, but is not limited to, PCs, workstations, laptops, PDAs, palm devices, servers, mobile devices, and the like. The computer 500 may include a processor 510, memory 520, and one or more input and/or output (I/O) 570 devices (or peripherals) that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

According to exemplary embodiments, the processor 510 is a hardware device for executing software that can be stored in the memory 520. The processor 510 can be virtually any custom made or commercially available processor, a central processing unit (CPU), a data signal processor (DSP), or an auxiliary processor among several processors associated with the computer 500, and the processor 510 may be a semiconductor based microprocessor (in the form of a microchip) or a macroprocessor.

The memory 520 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. In the example illustrated in FIG. 5, the software in the memory 520 includes a suitable operating system (O/S) 550, compiler 540, source code 530, and an application 560 of the exemplary embodiments.

The operating system 550 controls the execution of other computer programs, and provides scheduling, input-output control, file and data management, memory management, and communication control and related services. It is contemplated by the inventors that the application 560 for implementing exemplary embodiments is applicable on all other commercially available operating systems.

The application 560 may be a source program, executable program (object code), script, or any other entity comprising a set of instructions to be performed. When a source program is to be executed, then the program is usually translated via a compiler (such as the compiler 540), assembler, interpreter, or the like, which may or may not be included within the memory 520, so as to operate properly in connection with the O/S 550. Furthermore, the application 560 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O 570 devices may include input devices such as, for example but not limited to, a mouse, keyboard, scanner, microphone, etc. Furthermore, the I/O 570 devices may also include output devices, for example but not limited to, a printer, display, etc. Also, the I/O 570 devices may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc.

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software, it should be noted that the application 560 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 560 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 560 is implemented in hardware, the application 560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of a server for providing interactive services used with a time sensitive interactive application, comprising:
   receiving by the server a request for the interactive services that corresponds to a program from a set top box;
   determining by the server a program identification for the program, responsive to receiving from the set top box the request for the interactive services corresponding to the program;
   determining by the server an interactive software application, being stored in set top box memory on the set top box, that corresponds to the program currently displayed based on the program identification, the interactive software application stored in the set top box memory being configured with software to allow a user to interactively participate in the program currently displayed on a television to affect an outcome of the program currently displayed;

wherein the interactive software application has a corresponding interactive application identification number;

wherein the interactive software application corresponding to the program is one of a plurality of interactive software applications stored in the set top box memory on the set top box;

wherein in a first case an internet web browser with a uniform resource locator is to launch the interactive software application;

wherein in a second case the interactive software application stored in the set top box memory corresponds to a specific interactive software application based on the interactive application identification number, and the interactive application identification number is an identification to launch the specific interactive software application;

wherein in the second case the interactive software application stored in the set top box memory is distinct and separate from the internet web browser with the uniform resource locator;

wherein the interactive software application stored in the set top box memory is distinct and separate from an electronic programming guide;

transmitting by the server to the set top box the interactive application identification number that corresponds to the interactive software application for the program requested, the interactive application identification number causing the interactive software application stored in the set top box memory corresponding to the program to launch from the set top box memory on the set top box out of the plurality of interactive software applications stored in the set top box memory on the set top box;

wherein the interactive services of the interactive software application for the program are time sensitive such that when a series of music videos are displayed on the television, the interactive software application allows the user to vote for a desired one of the music videos.

2. The method of claim 1, wherein the program is media broadcast to the user;

wherein the specific interactive software application is the one out of the plurality of interactive software applications stored in the set top box memory;

wherein the plurality of interactive software applications stored in the set top box memory include the specific interactive software application for sports, the specific interactive software application for a shopping network, the specific interactive software application for a political talk show, the specific interactive software application for news, and the specific interactive software application for children programming.

3. The method of claim 1, wherein the program is media streamed to the user.

4. The method of claim 1, wherein a uniform resource locator is transmitted along with the interactive application identification number; and wherein the interactive software application corresponding to the program is a native local application for the program.

5. The method of claim 1, wherein the interactive application identification number is a global unique identification used to launch the interactive software application that corresponds to the program.

6. The method of claim 5, wherein the interactive software application allows for selections of options that coincide with the program; and wherein the selections are votes for a most valuable player candidate.

7. The method of claim 1, wherein the interactive software application allows for selections of options that coincide with the program; and wherein the selections are votes for the options.

8. The method of claim 1, wherein receiving by the server the request for the interactive services from the set top box comprises receiving a client identification, a current time stamp, and a channel of the program.

9. The method of claim 8, further comprising authenticating the client identification.

10. The method of claim 1, wherein determining the program identification for the program comprises:

performing an electronic program guide lookup to find a name of the program, the program identification, a start time for the program, and a stop time for the program.

11. The method of claim 8, wherein determining the interactive software application that corresponds to the program based on the program identification comprises:

mapping by the server the program identification for the program to the interactive software application.

12. An apparatus for providing interactive services used with a time sensitive interactive application, comprising:

a processor;

memory comprising computer-executable instructions that, when executed by the processor, cause the processor to perform operations comprising:

receiving a request for the interactive services that corresponds to a program from a set top box;

determining a program identification for the program, responsive to receiving from the set top box the request for the interactive services corresponding to the program;

determining an interactive software application, being stored in set top box memory on the set top box, that corresponds to the program currently displayed based on the program identification, the interactive software application stored in the set top box memory being configured with software to allow a user to interactively participate in the program currently displayed on a television to affect an outcome of the program currently displayed;

wherein the interactive software application has a corresponding interactive application identification number;

wherein the interactive software application corresponding to the program is one of a plurality of interactive software applications stored in the set top box memory on the set top box;

wherein in a first case an internet web browser with a uniform resource locator is to launch the interactive software application;

wherein in a second case the interactive software application stored in the set top box memory corresponds to a specific interactive software application based on the interactive application identification number, and the interactive application identification number is an identification to launch the specific interactive software application;

wherein in the second case the interactive software application stored in the set top box memory is distinct and separate from the internet web browser with the uniform resource locator;

wherein the interactive software application stored in the set top box memory is distinct and separate from an electronic programming guide;

transmitting to the set top box the interactive application identification number that corresponds to the interactive software application for the program requested, the interactive application identification number causing the interactive software application stored in the set top box memory corresponding to the program to launch from the set top box memory on the set top box out of the plurality of interactive software applications stored in the set top box memory on the set top box;

wherein the interactive services of the interactive software application for the program are time sensitive such that when a series of music videos are displayed on the television, the interactive software application allows the user to vote for a desired one of the music videos.

13. The apparatus of claim 12, wherein the interactive application identification number corresponds to a uniform resource locator for the program; and wherein the uniform resource locator is used to launch the interactive software application that corresponds to the program.

14. A computer program product, tangibly embodied on a non-transitory computer readable medium, for providing interactive services that, when executed by a server, cause the server to perform operations comprising:

receiving a request for the interactive services that corresponds to a program from a set top box;

determining a program identification for the program, responsive to receiving from the set top box the request for the interactive services corresponding to the program;

determining an interactive software application, being stored in set top box memory on the set top box, that corresponds to the program currently displayed based on the program identification, the interactive software application stored in the set top box memory being configured with software to allow a user to interactively participate in the program currently displayed on a television to affect an outcome of the program currently displayed;

wherein the interactive software application has a corresponding interactive application identification number;

wherein the interactive software application corresponding to the program is one of a plurality of interactive software applications stored in the set top box memory on the set top box;

wherein in a first case an internet web browser with a uniform resource locator is to launch the interactive software application;

wherein in a second case the interactive software application stored in the set top box memory corresponds to a specific interactive software application based on the interactive application identification number, and the interactive application identification number is an identification to launch the specific interactive software application;

wherein in the second case the interactive software application stored in the set top box memory is distinct and separate from the internet web browser with the uniform resource locator;

wherein the interactive software application stored in the set top box memory is distinct and separate from an electronic programming guide;

transmitting to the set top box the interactive application identification number that corresponds to the interactive software application for the program, the interactive application identification number causing the interactive software application stored in the set top box memory corresponding to the program to launch from the set top box memory on the set top box out of the plurality of interactive software applications stored in the set top box memory on the set top box;

wherein the interactive services of the interactive software application for the program are time sensitive such that when a series of music videos are displayed on the television, the interactive software application allows the user to vote for a desired one of the music videos.

15. The computer readable medium of claim 14, wherein the program is media broadcast to the user.

16. The computer readable medium of claim 14, wherein the program is media streamed to the user.

17. The computer readable medium of claim 14, wherein the interactive application identification number corresponds to a uniform resource locator for the program; and wherein the uniform resource locator is used to launch the interactive software application that corresponds to the program.

18. The computer readable medium of claim 14, wherein the interactive software application allows for selecting options that coincide with the program.

* * * * *